United States Patent
Claxton et al.

(10) Patent No.: US 8,610,775 B2
(45) Date of Patent: Dec. 17, 2013

(54) ESTIMATING STATES OF A PLURALITY OF TARGETS TRACKED BY A PLURALITY OF SENSORS

(75) Inventors: Christopher David Claxton, Bristol (GB); David Nicholson, Bristol (GB); Steven Reece, Oxford (GB); Stephen John Roberts, Wootton (GB)

(73) Assignee: BAE Systems PLC, London (GB)

( * ) Notice: Subject to any disclaimer, the term of this patent is extended or adjusted under 35 U.S.C. 154(b) by 393 days.

(21) Appl. No.: 13/056,478

(22) PCT Filed: Jul. 30, 2009

(86) PCT No.: PCT/GB2009/050944
§ 371 (c)(1),
(2), (4) Date: Jan. 28, 2011

(87) PCT Pub. No.: WO2010/013051
PCT Pub. Date: Feb. 4, 2010

(65) Prior Publication Data
US 2011/0169951 A1    Jul. 14, 2011

(30) Foreign Application Priority Data

Jul. 30, 2008    (EP) ..................................... 08252580
Jul. 30, 2008    (GB) ................................. 0813958.6

(51) Int. Cl.
*H04N 7/18* (2006.01)
*G06F 17/18* (2006.01)
*G06F 19/00* (2011.01)

(52) U.S. Cl.
USPC ........... 348/143; 702/181; 702/196; 702/197; 348/116

(58) Field of Classification Search
USPC ............................................ 348/169; 382/103
See application file for complete search history.

(56) References Cited

U.S. PATENT DOCUMENTS

2003/0204382 A1 * 10/2003 Julier et al. ................... 702/196

OTHER PUBLICATIONS

Matt L. Miller, Harold S. Stone, and Ingemar J. Cox. "Optimizing Murty's Ranked Assignment Method", Jul. 1997, IEEE Translation on Aerospace and Electronic Systems, vol. 33, No. 3, Log No. T-AES/33/3/04751. pp. 851-862.*
Durrant-Whyte et al., "Data Fusion in Decentralised Sensing Networks" 4th Intl Conf on Information Fusion (2001), 6 pages.
Manyika et al., "On Sensor Management in Decentralized Data Fusion" Proceedings of the 31st IEEE Conference on Decision and Control, (1992), vol. 4, pp. 3506-3507.

(Continued)

*Primary Examiner* — Joseph Ustaris
*Assistant Examiner* — Maryam Nasri
(74) *Attorney, Agent, or Firm* — Buchanan Ingersoll & Rooney PC

(57) ABSTRACT

A method of estimating states of a plurality of targets tracked by a plurality of sensors. The method includes obtaining a plurality of data sets based on measurements taken by a plurality of sensors, each data set including information on states of a plurality of targets. The method then generates a plurality of target correlation data sets describing correlation of the targets within a first data set and at least one other data set. A Generalised Covariance Union (GCU) technique is used to merge at least some of the plurality of target correlation data sets to generate an estimate of the states of the plurality of targets.

11 Claims, 3 Drawing Sheets

(56) References Cited

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Feb. 10, 2011, in the corresponding International Application No. PCT/GB2009/050944.

International Search Report (PCT/ISA/210) issued on Sep. 21, 2009, by British Patent Office as the International Searching Authority for International Application No. PCT/GB2009/050944.

Search Report issued on Jun. 3, 2009, by European Patent Office for Application No. 08252580.9.

Search Report issued on Jan. 27, 2009, by British Patent Office for Application No. 0813958.6.

Uhlmann, "Covariance consistency methods for fault-tolerant distributed data fusion", Information Fusion, Sep. 2003, pp. 201-215, vol. 4, No. 3.

Rogers et al., "Computational Mechanism Design for Information Fusion within Sensor Networks", 2006 9th International Conference on Information Fusion, Jul. 2006, pp. 1-7.

Blackman, "Multiple Hypothesis Tracking for Multiple Target Tracking", IEEE Aerospace and Electronic Systems Magazine, Jan. 2004, pp. 5-18, vol. 19, No. 1.

Julier et al., "Fusion of Time Delayed Measurements with Uncertain Time Delays", American Control Conference, Jun. 8, 2005, pp. 4028-4033.

Bochardt et al., "Generalized Information Representation and Compression Using Covariance Union", 2006 9th International Conference on Information Fusion, Jul. 2006, pp. 1-7.

Smith et al., "Approaches to Multisensor Data Fusion in Target Tracking: A Survey", IEEE Transactions on Knowledge and Data Engineering, Dec. 2006, pp. 1696-1710, vol. 18, No. 12.

Koushanfar et al., "Fault Tolerance Techniques for Wireless Ad Hoc Sensor Networks".

Wang et al., "Distributed Fault-Tolerant Classification in Wireless Sensor Networks", IEEE Journal on Selected Areas in Communications, Apr. 2005, pp. 724-734, vol. 23, No. 4.

* cited by examiner

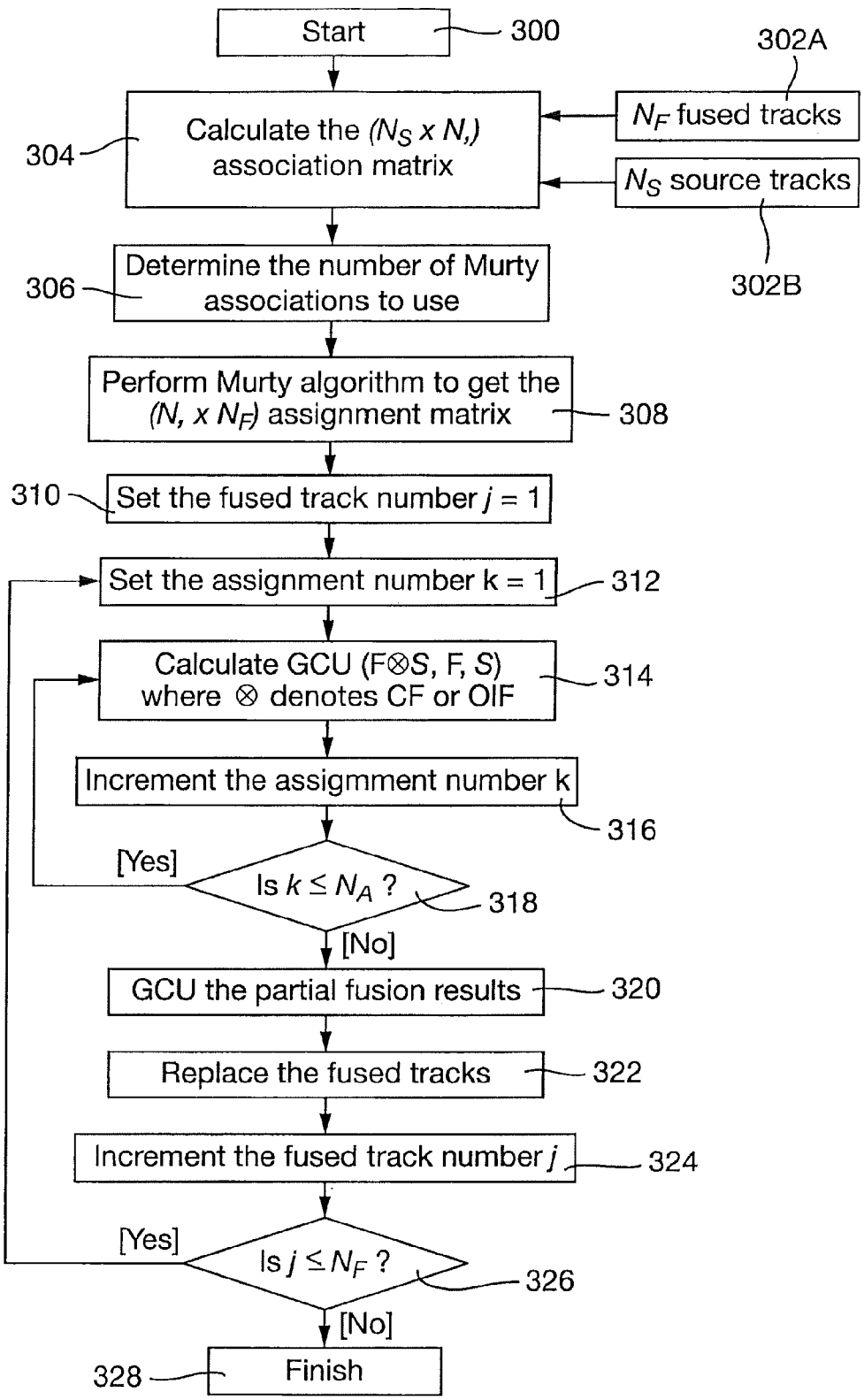

ESTIMATING STATES OF A PLURALITY OF TARGETS TRACKED BY A PLURALITY OF SENSORS

The present invention relates to estimating states of a plurality of targets tracked by a plurality of sensors.

Sensors are widely used for monitoring and surveillance applications and often track moving targets. A known sensing technique that involves multiple sensors is a distributed sensor fusion network. The sensors in the network operate a Decentralised Data Fusion (DDF) algorithm (DDF is described in J. Manyika and H. F. Durrant-Whyte, Data Fusion and Sensor Management: A Decentralised Information-Theoretic Approach, Ellis Horwood, 1994), where data based on measurements taken by each sensor in the network are transmitted to the other sensors. Each sensor then performs a fusing operation on the data it has received from the other sensors as well as data based on its own measurements in order to predict the states (typically locations and velocities) of the targets.

A problem associated with distributed sensor fusion networks is the effects of a corrupt or spurious estimate of a target state. A corrupt estimate may arise due to incorrect calibration, interference, etc, and can corrupt all estimates with which it is fused, which, in turn, can lead to the corruption of every estimate which is subsequently fused with that. Information in the network can thus become corrupted at a geometric rate. It is therefore desirable to eliminate or reduce this problem without adversely affecting the quality of the fused picture/state estimates. Moreover, it is preferred that a proposed solution can fit into an existing DDF framework without compromising its scalability and flexibility benefits.

According to one aspect of the present invention there is provided a method of estimating states of a plurality of targets tracked by a plurality of sensors, the method including:
obtaining a plurality of data sets based on measurements taken by a plurality of sensors, each said data set including information on states of a plurality of targets;
generating a plurality of target correlation data sets describing correlation of the targets within a first said data set and at least one other said data set, and
using a Generalised Covariance Union (GCU) technique to merge at least some of the plurality of target correlation data sets to generate an estimate of the states of the plurality of targets.

The step of obtaining a plurality of data sets may include obtaining a first data set based on target state measurements taken by a local sensor and at least one data set based on target state measurements taken by at least one remote sensor. The method may include obtaining a value denoting a reliability of the target state information within a said data set.

The correlation data sets may be generated using a "soft" hypothesis technique. The hypothesis technique may comprise Murty algorithm or multi-hypothesis tracker algorithm. The correlation data sets may include a representation of a probability of a target tracked within a first said data set (e.g. a local sensor) corresponding to a target tracked within a second said data set (e.g. a remote sensor).

The method may further include performing a GCU algorithm with arguments based on a fusion of the first data set and the second data set, the first data set, the second data set, and associated reliability values for each said argument. The fusion of the first data set and the second data set may be based on an algorithm selected from a set including: Kalman Filter, Conservative Filter, Optimal Information Filter (e.g. as described in S. J. Julier and J. K. Uhlmann, Generalised Decentralised Data Fusion with Covariance Intersection (CI). In D. Hall and J. Llinas, editors, Handbook of Data Fusion, Chapter 13, CRC Press, Boca Raton Fla., USA, 2001). The step of using a Generalised Covariance Union technique to merge said plurality of target correlation data sets to generate an estimate of the states of the plurality of targets may include performing a GCU algorithm with arguments based on a result of the performance of the GCU algorithm on the fusion of the first data set and the second data set, the first data set and the second data set.

The method may further include using the estimated targets states to update target state estimates in a DDF algorithm.

The method may further comprise transferring the generated estimate to at least one other processor configured to use the estimate to generate a further target state estimate. The at least one other processor may execute a Decentralised Data Fusion technique.

The correlation data may comprise a plurality of pairings of said data sets, and the step of using the GCU technique may comprise:
performing a fusion operation on each said pairing, and
applying a GCU algorithm to inputs comprising a result of each said fusion operation and corresponding said data sets in each said pairing.

The method may further include applying a further GCU algorithm to inputs comprising outputs of the first mentioned GCU algorithm to produce a single estimate.

According to another aspect of the present invention there is provided a sensor configured to estimate states of a plurality of targets tracked by a plurality of sensors, the sensor including:
an input device configured to obtain a plurality of data sets based on measurements taken by a plurality of sensors, each said data set including information on states of a plurality of targets;
a data correlation device for generating a plurality of target correlation data sets describing correlation of the targets within a first said data set and at least one other said data set, and
a merging device that uses a Generalised Covariance Union technique to merge said plurality of target correlation data sets to generate an estimate of the states of the plurality of targets.

According to another aspect of the present invention there is provided a computer program product comprising computer readable medium, having thereon computer program code means, when the program code is loaded, to make the computer execute a method of estimating states of a plurality of targets tracked by a plurality of sensors substantially as described herein.

According to yet another aspect of the present invention there is provided a plurality of sensors substantially as described herein, each sensor being configured to communicate information that it obtains regarding the state of the one target to at least one other said sensor.

According to a further aspect of the present invention there is provided a method of estimating states of a plurality of targets tracked by a plurality of sensors wherein a DDF process uses GCU to combine multiple mean/covariance estimates. There can also be provided a DDF network configured accordingly.

According to another aspect of the present invention there is provided a network of sensor nodes, wherein at least one of the sensor nodes configured to execute a method substantially as described herein. Other said sensor nodes may be configured to execute a conventional DDF algorithm.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 3 illustrates in more detail steps that can be executed, and

Figure 1:
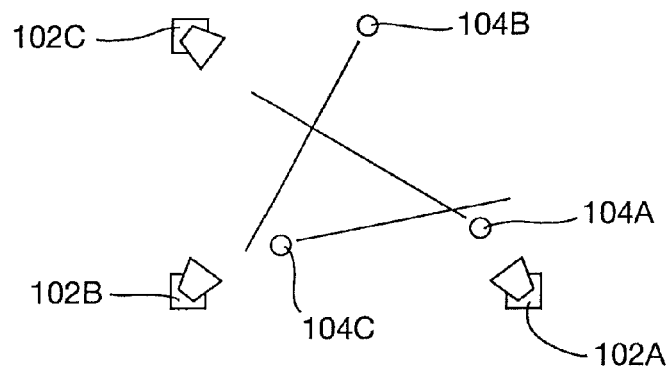
FIG. 1 is a schematic diagram of a plurality of sensors and plurality of targets.

Referring to FIG. 1, three sensors 102A-102C are shown in an environment in which there are three moving targets 104A-104C. It will be appreciated that the Figure is exemplary only and the system can operate with any number of sensors and any reasonable number of targets. An example of a sensor that could be used is AXIS 214 PTZ Camera used in CCTV systems. In the example the targets are moving (along the direction indicated by the respective arrows), whilst the sensors are essentially static. In other situations the sensor may be mounted on a vehicle, e.g an autonomous land, air or water-based vehicle.

Figure 2:
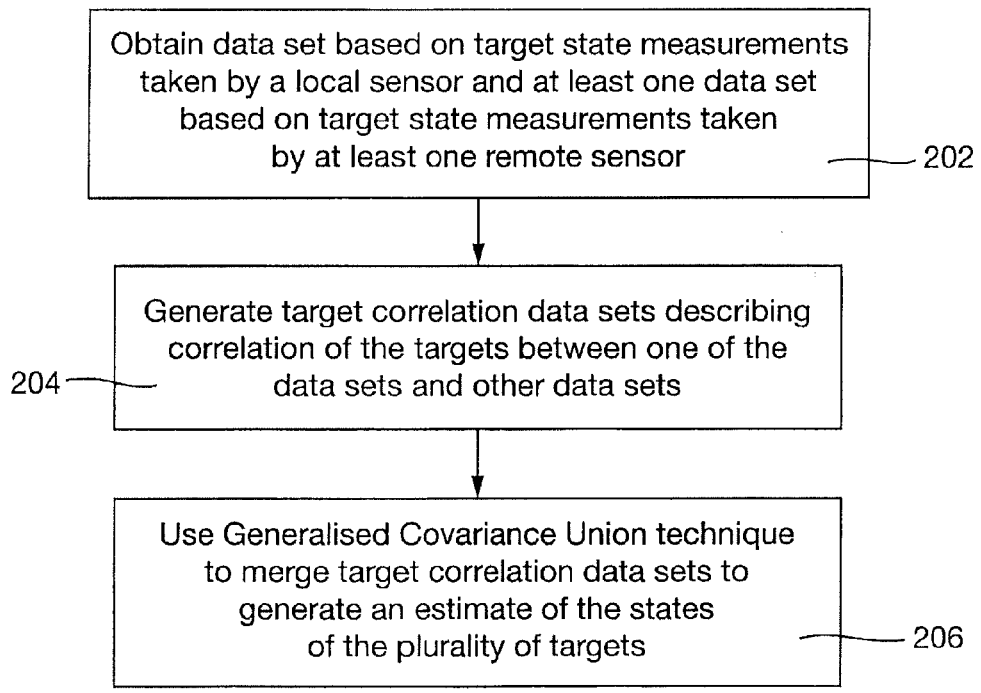
FIG. 2 illustrates schematically an outline of steps that can be executed to generate an estimate of targets states.

FIG. 2 outlines steps performed by a processor that is in communication with one of the sensors 102A-102C. The processor may be integral with the sensor, or it may be remote. In embodiments of the system, one or more of the network nodes may be configured as special ones that can provide functions that differ from those of conventional DDF nodes, such as changing data correlations/associations and allocating network-wide track numbers. The special nodes may transmit the DDF picture they have generated, whereas normal DDF nodes transmit only own their own sensor's data. Embodiments of the process described herein can run on multiple sensor platforms as part of a distributed data fusion network. They can operate on sensor data, track data or a mix of sensor and track data, provided that such data is represented in a common mean/covariance format.

At step 202, data sets including information on states (e.g. a mean position estimate in three-dimensional space) of a plurality of targets is obtained by the processor, e.g. via wired/wireless communications links. The target state data sets can include data based on measurements taken by one or more sensor associated/integrated with the processor (the "local" sensor(s)) and data based on measurements taken by at least one other sensor in the network ("remote" sensor(s)). The sensors can be nodes in distributed data fusion network and the measurements may be processed (called "tracks").

Each measurement is correlated with at least one value indicating the expected reliability of the target state information. These reliability values may be obtained by physical models/records of faulty data processes, or by other means. The measurement data will be expressed in standard form, e.g. for each target measured, a mean position estimate and an estimation error covariance matrix transformed to the same coordinate frame. In the example, there is a lower bound reliability value and an upper bound reliability value associated with each target state measurement/estimate.

In the example below, a local fusion node contains fused track estimates for three targets and receives target state estimates for four targets from a remote sensor (1):

| | |
|---|---|
| Remote sensor tracks: $S_1^{(1)}, S_2^{(1)}, S_3^{(1)}, S_4^{(1)}$ | reliability: $P_l^{(1)}, P_u^{(1)}$ |
| Local fused tracks: $F_1, F_2, F_3$ | reliability: $P_l^f, P_u^f$ |

At step 204 the processor generates target correlation data sets describing correlation of the targets between one of the data sets and the other data sets. The local and remote sensor data sets provide "pictures" that indicate the states of the targets and part of the present process aims to recognise if a target recorded in one state data set corresponds with a target recorded in another data set. For instance, the process seeks to match one of the targets from the data based on the local sensor with a target in data based on the measurements taken by the remote sensor. Unique target references may be assigned to the targets in order to help achieve this.

A "soft" data correlation technique is used, i.e. one that provides more than one "best guess" at which target in one data set matches one of the targets in another target state data set. In the example, the known Murty algorithm (described in, for example, M. L. Miller, H. S. Stone and I. J. Cox, "Optimizing Murty's ranked assignment method", IEEE Trans. Aerospace and Electronic Systems, Vol. 33, No. 3, ppo.851-862, 1997) is used, with the N element of the algorithm that represents the number of "best guesses" being set at an arbitrary small value ($\geq 1$). Alternatively, N may be determined from data, e.g. by thresholding the Murty score profile across candidate assignments. The skilled person will understand that alternative soft data association techniques, e.g. a multi-hypothesis tracker algorithm, could be utilised.

A value indicating the probability of the association being correct is also provided. As it is not known how to estimate the reliability of a Murty assignment (even for N=1, in which case Murty≡Munkres), a least informative (0, 1) probability bound is set for each candidate association. The result of executing the Murty algorithm with N=2 on the example data sets can be denoted as the following ordered set of candidate pairings:

| | |
|---|---|
| $\{F_1, S_1^{(1)}\} \{F_2, S_2^{(1)}\}$ | assignment probability $P_{A,1}$ |
| $\{F_1, S_3^{(1)}\}, \{F_2, S_2^{(1)}\}$ | assignment probability $P_{A,2}$, |
| | where A, 1 is the top-scoring assignment |
| | and A, 2 is the second top-scoring assignment. |

The data constituting each pair returned by the Murty algorithm is only partly reliable due to possible faults in the data generation process or system. Specifically, its probability of being reliable is only known to lie within a lower and upper bound. At step 206, the partially-reliable target associations generated by the Murty algorithm above are combined/merged using a process that involves the known Generalised Covariance Union (GCU) algorithm (see, for example, J. K. Uhlmann, "Covariance consistency methods for fault-tolerant distributed data fusion," *Information Fusion*, vol. 4, pp. 201-215, 2003 and S. Reece and S. Roberts, "Generalised covariance union and uncertain time measurement fusion," *IEEE Trans. Aerospace and Electronic Systems*, submitted, 2007). A brief illustration of the GCU algorithm will now be given for assisting with understanding. The table below describes fused estimates prior to GCU combination for two track fusion nodes labelled 1 and 2. The estimate of node i includes the state value $x_i$, precision $P_i^{-1}$ and confidence interval $[l_i, u_i]$. The estimates of both nodes are augmented with respective zero precision consistent estimate $\hat{y}$.

The $\otimes$ symbol in the table denotes a fusion operation. It will be assumed that the estimates are statistically independent and can be fused using a standard Kalman filter.

| Pairs | Precision | Confidence Interval |
|---|---|---|
| $\hat{x}_1 \otimes \hat{x}_2$ | $P_1^{-1} + P_2^{-1}$ | $[l_1 l_2, u_1 u_2]$ |
| $\hat{x}_1 \otimes \hat{y}_2$ | $P_1^{-1}$ | $[l_1(1 - u_2), u_1(1 - l_2)]$ |
| $\hat{y}_1 \otimes \hat{x}_2$ | $P_2^{-1}$ | $[(1 - u_1)(1 - l_2), (1 - l_1)u_2]$ |
| $\hat{y}_1 \otimes \hat{y}_2$ | 0 | $[(1 - u_1)(1 - u_2), (1 - l_2)(1 - l_2)]$ |

The combined estimate below is determined using GCU:

$$\hat{x} = \text{GCU}(\{\hat{x}_1 \otimes \hat{x}_2, \hat{x}_1 \otimes \hat{y}_2, \hat{y}_1 \otimes \hat{x}_2\})$$

By omitting $\hat{y}_1 \otimes \hat{y}_2$, $\hat{x}$ has a finite covariance matrix. When both estimates, $\hat{x}_1$ and $\hat{y}_2$, are completely reliable then $l_1 = u_1 = l_2 = u_2 = 1$ and the output of the above algorithm is identical to the Kalman filter estimate $\hat{x}_1 \otimes \hat{x}_2$ as required. When there is no confidence in any of the input estimates then $l_i = 0$ and $u_i = 1$ for all nodes i and the above algorithm reduces to known Covariance Union (CU) as required.

To illustrate, the following example demonstrates the steps in the general fusion algorithm for the integration of a pair of estimates. These estimates are:

$$\hat{x}_1 = [-1, 0], P_1 = \begin{pmatrix} 1 & 0.5 \\ 0.5 & 1 \end{pmatrix}, p_1 \in [0.2, 0.4],$$

$$\hat{x}_2 = [1, 0], P_2 = \begin{pmatrix} 1 & -0.5 \\ -0.5 & 1 \end{pmatrix}, p_2 \in [0.6, 0.8]$$

Four new estimates are created by fusing the input estimates and the auxiliary estimates using the Kalman filter yielding the following estimates with corresponding covariance matrices and confidence intervals:

| Pairs | Precision | Confidence Interval |
|---|---|---|
| $x_1 \otimes x_2$ | $P_1^{-1} + P_2^{-1}$ | $[0.12, 0.32]$ |
| $x_1 \otimes y_2$ | $P_1^{-1}$ | $[0.04, 0.16]$ |
| $y_1 \otimes x_2$ | $P_2^{-1}$ | $[0.36, 0.64]$ |
| $y_1 \otimes y_2$ | 0 | $[0.12, 0.32]$ |

Finally, the three estimates (excluding the zero precision estimate $\hat{y}_1 \otimes \hat{y}_2$) are combined using GCU. The confidence interval assigned to the GCU combined estimate is $[0.8, 1]$. The combined estimate obtained using standard CU is considered to have zero precision.

Returning to the present embodiment, an intention is to combine/merge the target correlation data sets to generate a more accurate estimate of the states of the plurality of targets. Consider two estimates represented by the mean/covariance pairs (a, A) and (b, B). For example, (a, A) may be a local track estimate and (b, B) can be a remote track that another node has communicated to the processor. If these estimates are inconsistent with each other (i.e. do not gate) then something is clearly wrong, but there is no indication whether the fault lies with the local estimate or the remote estimate. One option would be to maintain separate hypotheses, but that option is usually inoperable because the hypotheses can quickly proliferate in a decentralised network and become very difficult to manage.

An alternative option used in the present embodiment is to merge the hypotheses into a single estimate. It is important that the merged estimate is statistically consistent, in the sense that its predicted uncertainty is not less than the actual uncertainty. The known Covariance Union (CU) algorithm guarantees consistency when the probabilities of the separate hypotheses are completely unknown. GCU relaxes this condition to incorporate known bounds on the probabilities. GCU approaches CU when the bounds are completely open and approaches Standard Mixture Reduction when the probabilities are exactly known. The algorithms can operate in batch or recursive mode and involve linear algebraic operations as well as a straightforward numerical optimisation step.

This merging/combining step can be denoted as follows for the example data:

$$F_{1,1} = g(F_1 \otimes S_1^{(1)}, F_1, S_1^{(1)}),$$

$$F_{2,2} = g(F_2 \otimes S_2^{(1)}, F_2, S_2^{(1)}),$$

$$F_{3,3} = g(F_3 \otimes S_3^{(1)}, F_3, S_3^{(1)})$$

$F_{1,1}$, $F_{2,2}$ and $F_{3,3}$ have the assignment probability $P_{A,1}$ $$F_{1,3} = g(F_1 \otimes S_3^{(1)}, F_1, S_3^{(1)}),$$

$$F_{2,2} = g(F_2 \otimes S_2^{(1)}, F_2, S_2^{(1)}),$$

$$F_{3,1} = g(F_3 \otimes S_1^{(1)}, F_3, S_1^{(1)})$$

$F_{1,3}$, $F_{2,2}$ and $F_{3,1}$ have the assignment probability $P_{A,2}$

This step comprises a hybrid fusion-union algorithm for merging partially trusted estimates. The symbol $\otimes$ denotes the fusion part, whilst the function g denotes the union part (i.e. Generalised Covariance Union). The fusion part function can be selected from a set of available filter techniques. For example, the fusion function may comprise a Conservative Filter, e.g. Covariance Intersection, when it is known that there is correlation between the target estimation errors. Alternatively, the fusion function may comprise a standard data fusion algorithm/filter, e.g. Optimal Information or Kalman Filter, when it is known that there is no correlation with other data, i.e. the data is known to be statistically independent (e.g. it comprises measurements taken by the processor's own sensor). Thus, the result of this GCU operation is a set of GCU outputs corresponding to the N candidate pairings returned by the Murty algorithm.

The GCU step folds in the probability interval values $P_l^f$, $P_u^f$, $P_l^{(1)}$, $P_u^{(1)}$. The combined track pairs have a consistent though conservative covariance and associated reliability bounds.

The partially-reliable fused estimates generated are then combined so that multiple candidate solutions do not have to be stored in computer memory and/or transmitted over a constrained communications network. This merging/combining step can be denoted as follows for the example data:

$F_1 = g(F_{1,1}, F_{1,2})$, $F_2 = g(F_{2,1}, F_{2,2})$, $F_3 = g(F_{3,1}, F_{3,2})$

This GCU operation folds in the assignment probabilities $P_{A,1}$ and $P_{A,2}$ and the operation is repeated for every target that has multiple candidate solutions. Any unpaired track taken by the remote sensor can be added to the fused track list: $F_4 = S_4^{(1)}$ In cases where there is more than one sensor associated/integrated with the processor then the above steps can be repeated for the further sensor/sensors' tracks. The estimates generated can be used to update the target states.

FIG. 3 illustrates the process steps in more detail. The process begins at 300 and inputs comprising $N_F = 2$ fused target track data set(s) 302A and $N_S = 6$ target track data set(s)

302B are displayed. Each track can include state information for the target, e.g. position in 3D space (although other states such as velocity and angle may be used), as well as a value representing the uncertainty/reliability of the track.

At step 304 the ($N_S \times N_F$) correlation matrix is produced from the inputs. At step 306 the number of Murty Algorithm associations to be used is determined, as discussed above, and at step 308 the Murty Algorithm is applied to the association matrix to generate an assignment matrix ($N_A \times N_F$), which indicates which target in one of the input data sets may correspond to a target in one of the other input data sets.

At step 310 a variable j that represents the fused track number currently being processed is initialised to 1. At step 312 a variable k that represents the assignment number currently being processed is initialised to 1. At step 314 the result of the combining function GCU(F ⊗ S, F, S) is calculated. At step 316 the variable k is incremented and at step 318 a question is asked whether k is less than or equal to $N_A$. If the answer to that question is positive then control is passed back to step 314, otherwise step 320 is performed. At step 320 the GCU function is performed on the result of the calculation completed at step 314. Then, at step 322 the result of step 320 is used to update the target state estimate.

At step 324 the variable j is incremented and at step 326 a question is asked whether j is less than or equal to $N_F$. If the answer to that question is positive then control passed back to step 312, otherwise the process ends at step 328.

Figure 4A:
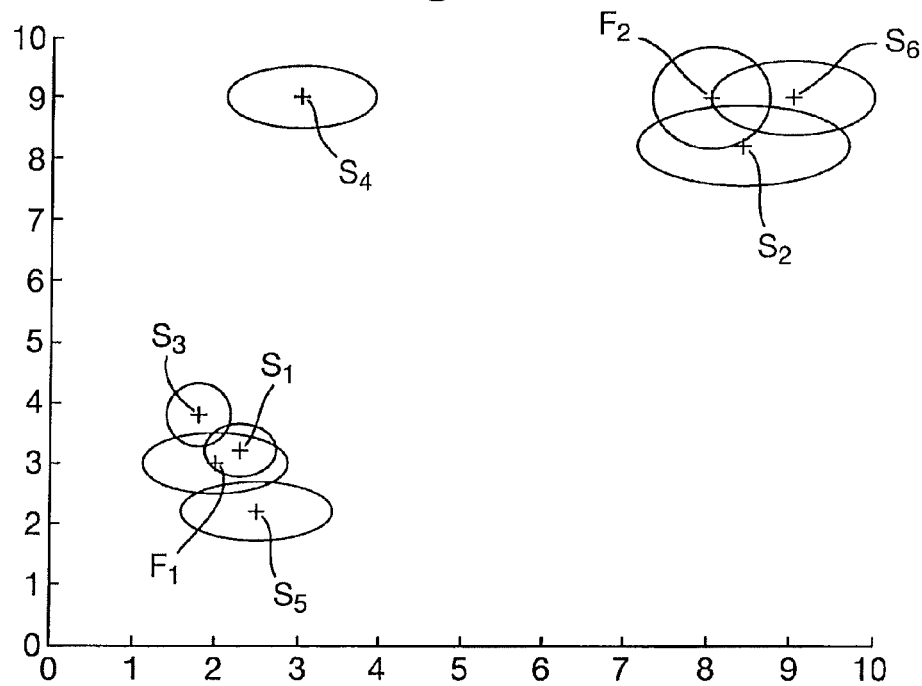
FIGS. 4A and 4B are graphical representations of example input and output data for the process.

A graphical representation of other example measurement data/tracks used as the input for the process is shown in FIG. 4A. A distributed fusion node in a network maintains two track estimates F1 and F2. The node is then presented with a new set of data S1-S6 from other nodes. The elements of this new data are only partially reliable. The track estimates and data are represented in FIG. 4A as mean 2D position values (the + symbol) at the centre of associated error covariance ellipses.

Figure 4B:
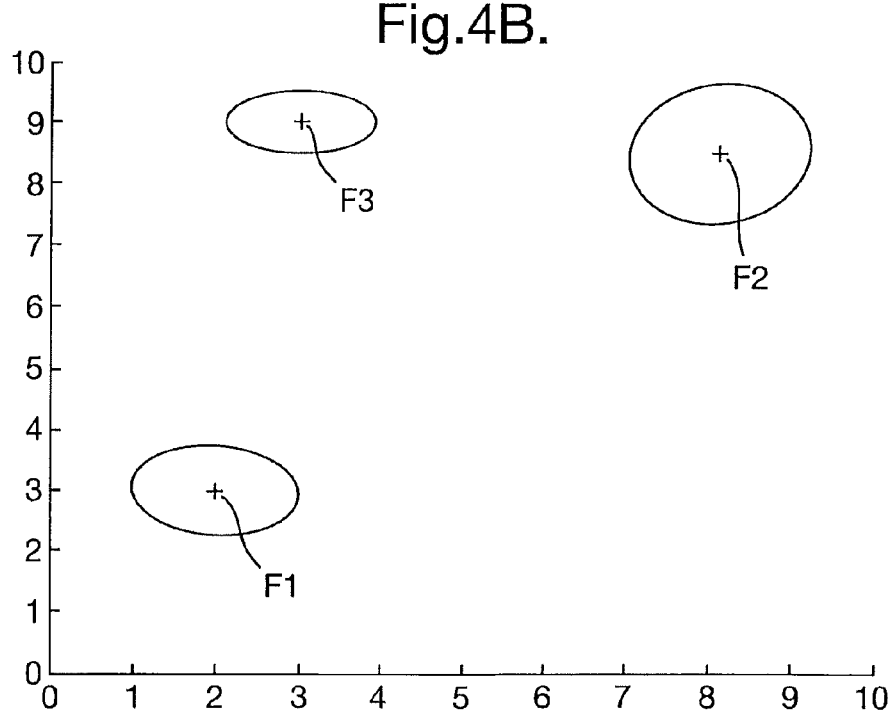

A graphical representation of the result of applying the process to the input of FIG. 4A is shown in FIG. 4B. The track estimates F1 and F2 have been updated with the new data and a new track estimate F3 has been generated. All of these estimates, though somewhat conservative, are statistically consistent.

The invention claimed is:

1. A method of estimating states of a plurality of targets tracked by a plurality of sensors, the method including:
   obtaining a plurality of data sets based on measurements taken by a plurality of sensors, each of said data sets respectively including information on states of a plurality of targets;
   generating a plurality of target correlation data sets each respectively describing a correlation between at least one of the targets within a first one of said data sets and the corresponding target within at least one other one of said data sets; and
   using a Generalised Covariance Union (GCU) technique for merging at least some of the plurality of target correlation data sets to generate a single estimate of the states of the plurality of targets,
   wherein the target correlation data sets comprise a plurality of pairings of said data sets, and
   wherein using the GCU technique comprises:
   performing a fusion operation on each of said pairings;
   applying a first GCU algorithm to inputs comprising a result of each fusion operation and the corresponding data sets in each of said pairings; and
   applying a second GCU algorithm to inputs comprising outputs of the first GCU algorithm to produce the single estimate.

2. A method according to claim 1, wherein the obtaining a plurality of data sets includes:
   obtaining a first data set based on target state measurements taken by a local sensor and at least one data set based on target state measurements taken by at least one remote sensor.

3. A method according to claim 2, including:
   obtaining a value denoting a reliability of the target state information within at least one of said data sets.

4. A method according to claim 1, wherein the correlation data sets are generated using a Murty algorithm.

5. A method according to claim 4, wherein the correlation data sets include a representation of a probability of a target tracked within a first said data set corresponding to a target tracked within a second said data set.

6. A method according to claim 5, including executing a GCU algorithm with arguments based on a fusion of the first data set and the second data set, the first data set, the second data set, and associated reliability values for each said argument.

7. A method according to claim 6, wherein the fusion of the first data set and the second data set includes:
   selecting an algorithm from a set including: Kalman Filter, Conservative Filter, and Optimal Information Filter.

8. A method according to claim 6, wherein using the GCU technique includes:
   performing the second GCU algorithm with arguments based on a result of performance of the first GCU algorithm on the fusion of the first data set and the second data set, the first data set and the second data set.

9. A method according to claim 1, including:
   using the estimates of the states of the plurality of targets to update target state estimates in a DDF algorithm.

10. A sensor configured to estimate states of a plurality of targets tracked by a plurality of sensors, the sensor including:
   an input device configured to obtain a plurality of data sets based on measurements taken by a plurality of sensors, each of said data sets respectively including information on states of a plurality of targets;
   a data correlation device for generating a plurality of target correlation data sets each respectively describing a correlation between at least one of the targets within a first one of said data sets and the corresponding target within at least one other one of said data sets; and
   a merging device for using a Generalised Covariance Union (GCU) technique to merge at least some of the plurality of target correlation data sets to generate a single estimate of the states of the plurality of targets,
   wherein the target correlation data sets comprise a plurality of pairings of said data sets, and
   wherein the merging device is configured to use the GCU technique by:
   performing a fusion operation on each of said pairings;
   applying a first GCU algorithm to inputs comprising a result of each fusion operation and the corresponding data sets in each of said pairings; and
   applying a second GCU algorithm to inputs comprising outputs of the first GCU algorithm to produce the single estimate.

11. A computer program product comprising a non-transitory computer readable medium, having thereon computer program code means, when the program code is loaded, to make the computer execute a method of estimating states of a plurality of targets tracked by a plurality of sensors, the method including:

obtaining a plurality of data sets based on measurements taken by a plurality of sensors, each of said data sets respectively including information on states of a plurality of targets;

generating a plurality of target correlation data sets each respectively describing a correlation between at least one of the targets within a first one of said data sets and the corresponding target within at least one other one of said data sets; and using a Generalised Covariance Union (GCU) technique for merging at least some of the plurality of target correlation data sets to respectively generate a single estimate estimates of the states of the plurality of targets, wherein the target correlation data sets comprise a plurality of pairings of said data sets, and wherein using the GCU technique comprises:

performing a fusion operation on each of said pairings;

applying a first GCU algorithm to inputs comprising a result of each fusion operation and the corresponding data sets in each of said pairings; and applying a second GCU algorithm to inputs comprising outputs of the first GCU algorithm to produce the single estimate.

* * * * *